United States Patent [19]

Dietz

[11] 4,325,616
[45] Apr. 20, 1982

[54] APPARATUS FOR VARYING THE SPECTRAL FILTER OVER THE PHOTOCELL AS A FUNCTION OF BLADE POSITION

[75] Inventor: Milton S. Dietz, Lexington, Mass.

[73] Assignee: Polaroid Corporation, Cambridge, Mass.

[21] Appl. No.: 110,811

[22] Filed: Jan. 10, 1980

[51] Int. Cl.³ .............................. G03B 7/14; G03B 7/18
[52] U.S. Cl. .................................. 354/27; 354/34; 354/42; 354/59; 354/139; 250/482; 356/225
[58] Field of Search ............................. 354/27, 28–30, 354/26, 33, 34, 38, 42, 43, 49, 50, 59, 128, 139; 350/1.1–1.4, 195, 196; 250/482; 356/215, 224, 225

[56] References Cited

U.S. PATENT DOCUMENTS

| | | |
|---|---|---|
| 2,015,261 | 9/1935 | Eckler . |
| 2,086,791 | 7/1937 | Dresler . |
| 2,380,216 | 7/1945 | Carter . |
| 2,585,245 | 2/1952 | Harrison . |
| 2,841,064 | 7/1958 | Bagby . |
| 3,006,265 | 10/1961 | La Rue . |
| 3,045,124 | 7/1962 | McKinlay ............................ 250/226 |
| 3,053,159 | 9/1962 | Bagby . |
| 3,173,347 | 3/1965 | Stimson et al. . |
| 3,176,599 | 4/1965 | Anwyl . |
| 3,208,363 | 9/1965 | Easterly et al. . |
| 3,229,569 | 1/1966 | Frost et al. . |
| 3,270,638 | 9/1966 | Anwyl . |
| 3,314,349 | 4/1967 | Koeber . |
| 3,397,023 | 8/1968 | Land .................................. 350/160 |
| 3,468,228 | 9/1969 | Rogers . |
| 3,500,730 | 3/1970 | Matsubara ........................... 356/225 |
| 3,536,408 | 10/1970 | Norwood ............................ 356/219 |
| 3,583,299 | 6/1971 | Land .................................. 250/205 |
| 3,589,258 | 6/1971 | Koeber . |
| 3,672,281 | 6/1972 | Land . |
| 3,709,615 | 1/1973 | Blakeslee et al. ................... 356/224 |
| 3,780,631 | 12/1973 | Schulman ....................... 356/225 X |
| 3,785,265 | 1/1974 | Lardeau . |
| 3,792,649 | 2/1974 | Douglas ............................. 354/192 |
| 3,832,722 | 8/1974 | Douglas ............................. 354/29 |
| 3,896,458 | 7/1975 | Johnson ............................. 354/30 |
| 3,903,413 | 9/1975 | Manning ............................ 250/226 |
| 3,942,183 | 3/1976 | Whiteside .......................... 354/29 |
| 3,942,184 | 3/1976 | Blinow .............................. 354/42 |
| 3,963,333 | 6/1976 | Meuller .............................. 352/72 |
| 4,040,070 | 8/1977 | Hochreiter ......................... 354/59 |
| 4,040,072 | 8/1977 | Johnson ............................. 354/173 |
| 4,104,653 | 8/1978 | Johnson ............................. 354/27 |
| 4,147,418 | 4/1979 | Whiteside .......................... 354/27 |
| 4,156,564 | 5/1979 | Tsunekawa ......................... 354/59 |
| 4,160,588 | 7/1979 | Beach ................................ 354/31 |

FOREIGN PATENT DOCUMENTS 3036522 4/1981 Fed. Rep. of Germany .
1001537 8/1965 United Kingdom ................ 350/196

Primary Examiner—L. T. Hix
Assistant Examiner—Stafford D. Schreyer
Attorney, Agent, or Firm—Leslie J. Payne

[57] ABSTRACT

Apparatus for automatically varying positioning of an infrared filter relative to a light sensing photocell of an exposure control system having scanning type shutter blades provided with cooperating pairs of primary and secondary apertures, which are displaced between first and second positions to respectively control the passage of light to a film plane and to the photocell, includes an infrared filter cooperating with at least one secondary aperture for blocking transmission of infrared to the photocell when the apertures are positioned for high ambient light conditions and for allowing passage of infrared to the photocell when positioned for low ambient light conditions where flash illumination provides a greater contribution to the exposure.

12 Claims, 5 Drawing Figures

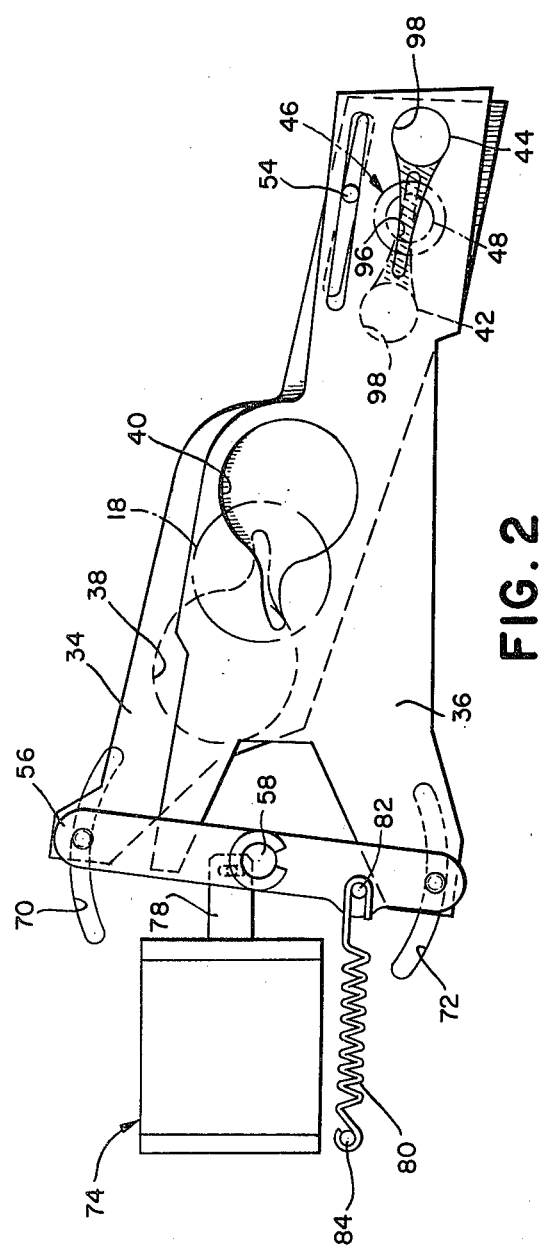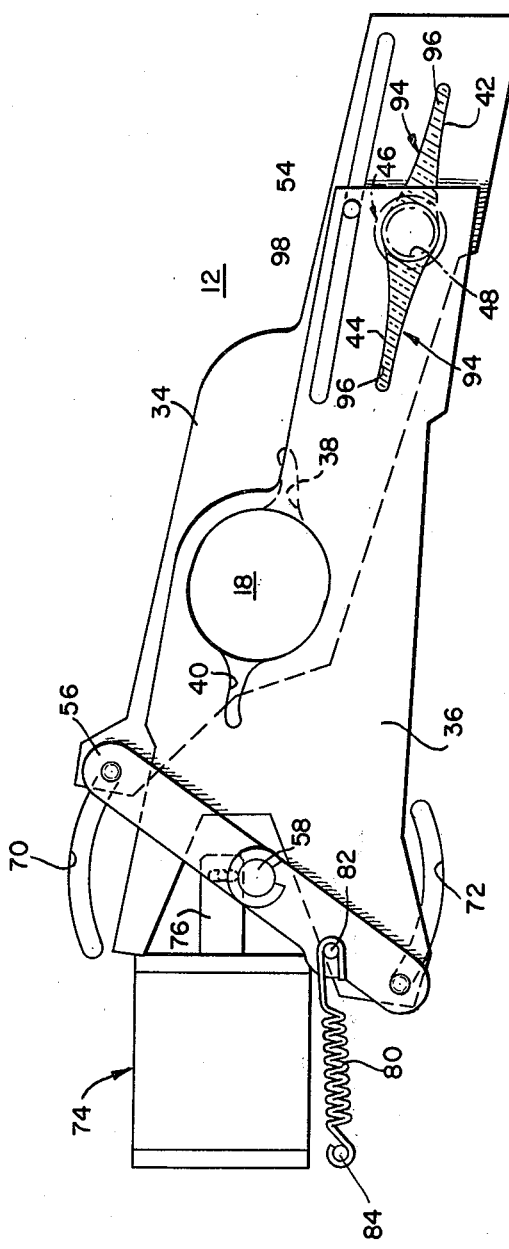

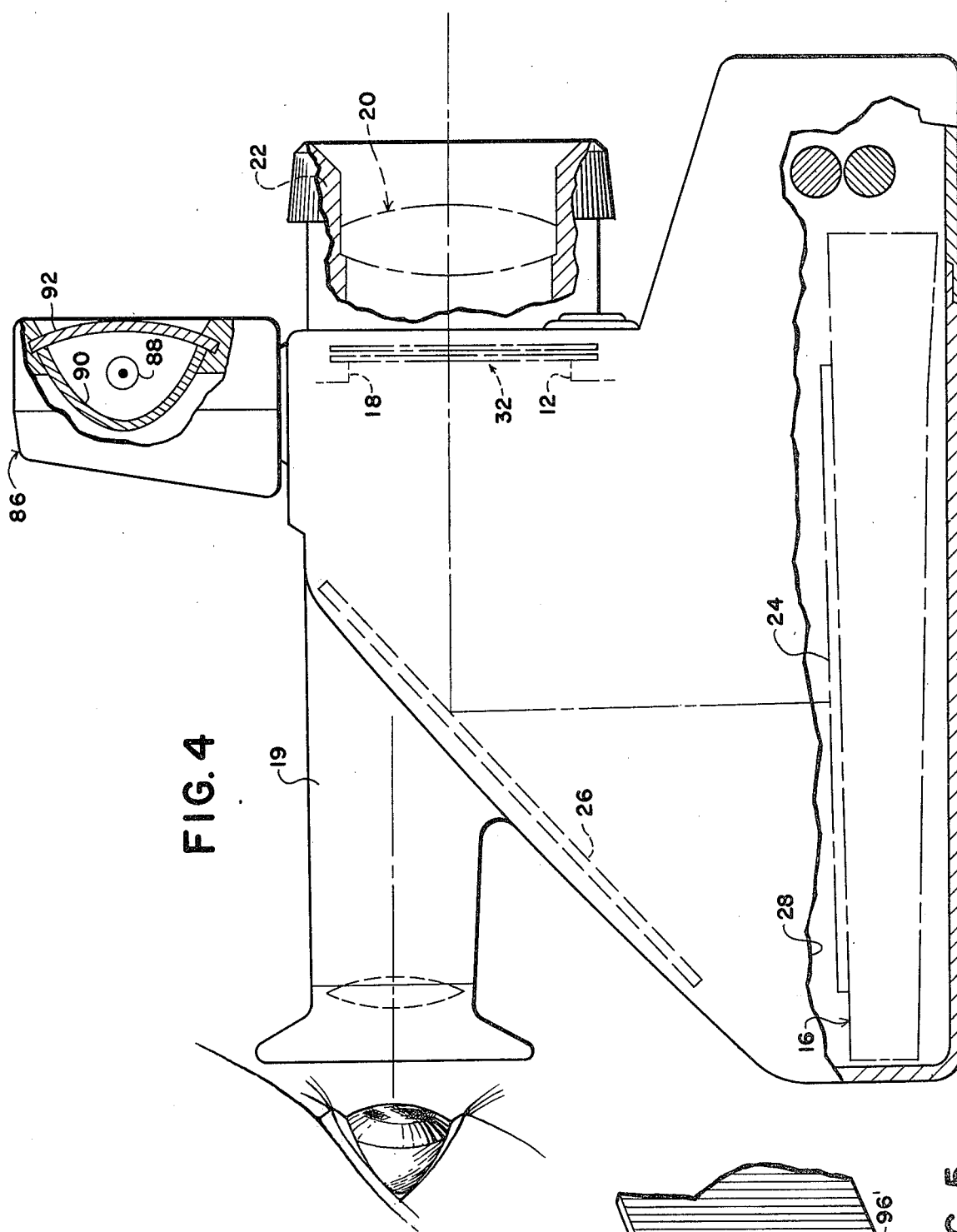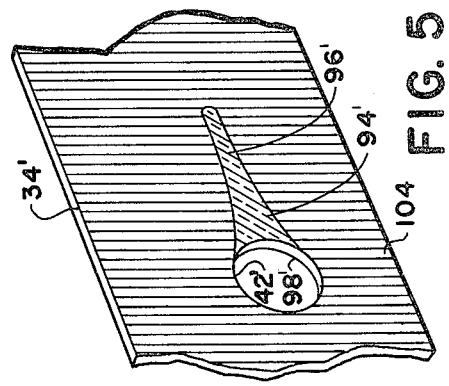

APPARATUS FOR VARYING THE SPECTRAL FILTER OVER THE PHOTOCELL AS A FUNCTION OF BLADE POSITION

BACKGROUND OF THE INVENTION

This invention relates generally to the photographic field, and more particularly, an improved method and exposure control system for automatically and selectively controlling the filtering of light incident upon a photoresponsive element during exposure in either predominantly artificial or natural light as a function of such incident light.

Automatic light responsive control systems are well known in the photographic arts. Essentially, these systems evaluate scene brightness levels of illumination for controlling exposure parameters, including effective aperture size and exposure interval, as a function of scene brightness evaluated against the sensitometric characteristics of the film being used. Typically, scene brightness evaluation is performed with light-measuring circuits including one or more photoresponsive elements.

One such automatic exposure control system employs scanning type shutter blades. Exemplary scanning shutter blades usable in exposure control systems are generally disclosed in U.S. Pat. No. 3,942,183, issued Mar. 2, 1976, to George Whiteside; and U.S. Pat. No. 4,104,653, issued Aug. 1, 1978, to Bruce K. Johnson et al., all of which are presently assigned with the present application. As described in these patents, there are cooperating pairs of primary and secondary apertures formed in the shutter blades. These pairs of apertures cooperate respectively for blocking and unblocking the passage of light through an exposure opening to a film plane and through a photocell opening to a light sensing or photoresponsive cell used for controlling blade positioning. During the exposure cycle, the secondary apertures operate in conjunction with the photocell and a control circuit to define both the aperture values achieved and the exposure interval as a function of the amount of light received through the secondary apertures. In such systems, photoresponsive elements of the silicon type are commonly used because they, among other things, have excellent long term stability and linearity of output signal with input light power changes.

For optimizing the quality of the resultant photographs when using automatic exposure control systems, such as the type noted, it is known to employ spectral correction filters to correlate the spectral sensitivity curve of the photoresponsive element more closely with that of the photographic color film. Without such a filter, the photocell would react to the light frequencies, such as infrared (IR), and cause the control circuit to terminate exposure earlier than desired. This is especially the case when the photocell is of the silicon type, because such a photocell tends to be red (IR) sensitive. For providing the desired correction, a spectral correction filter is interposed in the photocell's optical path, for example, as described in U.S. Pat. No. 3,903,413, issued on Sept. 2, 1975, to Monis Manning; and commonly assigned with the present application. This patent discloses use of a silicon photodiode, sensitive to radiant energy between about 350 nm and 1200 nm, whereas the sensitivity of typical color photographic film is confined to the visible region of the spectrum, i.e., from about 400 nm to about 700 nm. Use is made of a spectral correction filter with peak absorption in the near-infrared region (700–1200 nm) and high transmission in the visual region to correct or generally match the spectral response of the photocell in relation to the film. This matching of sensitivities is particularly useful in cameras employing diffusion transfer photographic processes of the so-called "instant photography" type where errors in the exposure cannot be later compensated for as is possible with film subsequently developed in a photographic laboratory.

While use of infrared filters serve satisfactorily, complications can arise when reflectivities of different objects in photographic scenes exhibit widely disparate values, for example, where the exposure of the subject's facial skin is adversely affected because of the widely disparate reflectivities of the surrounding clothing or other objects, particularly in close-up situations. Partly as a result of this, it has been found advantageous to remove the infrared filter in flash exposure modes of operation.

Consequently, although retention of a spectral correction filter in the photocell's optical path has been practiced during both ambient and artificial illumination modes, the spectral correction filter may also be removed from the photocell's optical path when the flash mode is desired, as disclosed in U.S. Pat. No. 4,040,070, issued on Aug. 2, 1977, to W. Hochreiter et al.

Still other known prior art is described in U.S. Pat. No. 3,468,228, issued on Sept. 23, 1969, to Howard G. Rogers, which provides automatic sequential positioning of a pair of dual filters over photocell and exposure apertures to attain a color balance exposure of photosensitive material.

SUMMARY OF THE INVENTION

In accordance with the present invention, there is provided an improved apparatus for automatically positioning a filter relative to the optical path of a photocell in an exposure control system. As in prior art photographic camera apparatus, there are means for mounting photographic film material at a given focal plane and a light exposure opening for allowing passage of light to the film and to detecting means for evaluating scene light. A blade mechanism, mounted for displacement between first and second positions, defines both changing primary aperture values over the exposure opening and changing secondary aperture values over the detecting means as it moves to the second position. Selectively actuatable drive means are provided for initially displacing the blade mechanism from the first position toward the second position, and in response to the amount of scene light detected by the detecting means for also returning the blade mechanism to the first position.

In an illustrated embodiment, spectral filtering means are carried by the blade mechanism for precluding transmission of light of selected frequencies to the detecting means during at least one portion of the noted blade mechanism displacement and for transmitting the selected frequencies to the detecting means during another portion of said displacement.

In a preferred embodiment, the blade mechanism includes a pair of shutter blades, each having spaced primary and secondary apertures. Each blade is movable in overlapping relationship with the other so that the primary apertures define a range of progressively increasing aperture values over the exposure opening while the secondary apertures define a range of progressively increasing aperture values over the detecting means as the blades are moved toward their second position. The filtering means is defined by a relatively thin sheet of an infrared absorption filter material coupled to the blade mechanism and occupying a selected portion of a secondary aperture so that its position relative to the detecting means is dependent upon the position of the blade mechanism during movement between the noted first and second positions. Each infrared filter is associated with the secondary aperture and is displaced therewith so that the filter overlies the scene light detecting means when the blade mechanism is initially displaced toward the second position and is displaced out of the overlying relation to the detecting means as the blade mechanism approaches its second position.

Among the objects of the invention are, therefore, the provision of an improved exposure control system for photographic apparatus wherein a filter is positioned automatically relative to the optical path of a photocell during an exposure interval; the provision of an improved photographic apparatus having an exposure control system wherein a filter is arranged to selectively intercept the photocell's optical path as a function of the intensity of scene light incident on the photocell; and the provision of an improved shutter blade and filter arrangement usable in an exposure control system.

Other objects and further scope of applicability of the present invention will become apparent from the detailed description to follow when taken in conjunction with the accompanying drawings in which like parts are designated by like reference numerals.

BRIEF DESCRIPTION OF THE DRAWINGS

FIG. 2 is an elevational view diagrammatically depicting the exposure control system of FIG. 1 in another arrangement during operation;

FIG. 3 is an elevational view diagrammatically depicting the exposure control system of FIGS. 1 and 2 in still another arrangement during operation;

FIG. 4 is a side elevational view diagrammatically depicting the photographic camera and exposure control system; and FIG. 5 is an enlarged fragmented view illustrating details of another exposure control blade usable in the exposure control system of FIGS. 1 to 4.

DESCRIPTION OF THE PREFERRED EMBODIMENT

Figure 1:
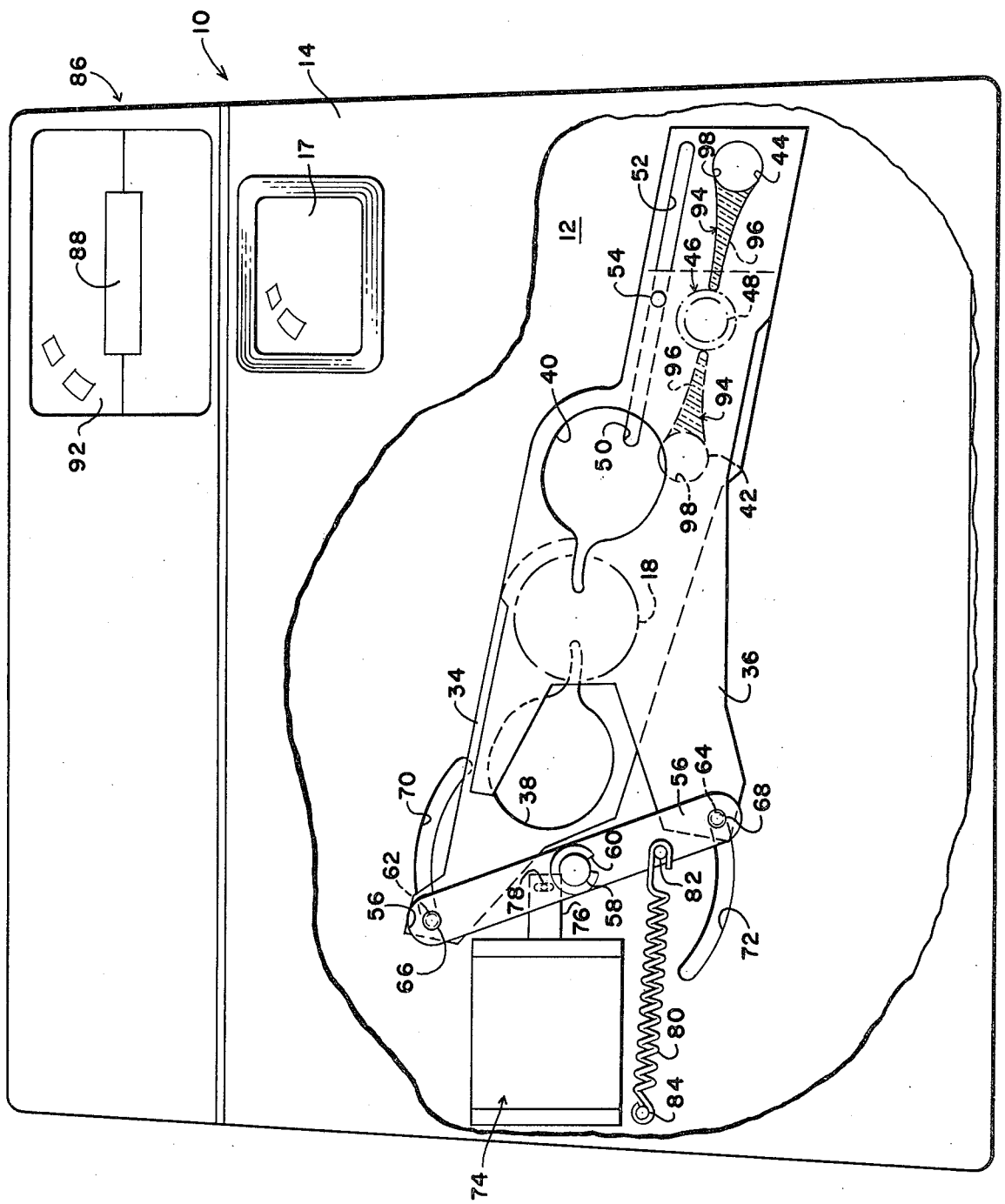
FIG. 1 is an elevational view diagrammatically depicting a photographic camera incorporating the improved exposure control system of this invention during one instant of operation.

Referring now to FIG. 1, it can be seen that the improved exposure control system of this invention is disposed within a photographic camera housing 10. Included in the housing 10 is a rear casting 12 machined to support the components of the exposure control system. Surrounding the casting 12 is a cover 14. Centrally disposed within the back wall of casting 12 is light entering exposure opening 18 for defining the maximum available exposure aperture for the control system and for allowing passage of scene light to the photographic film (not shown). Additionally, a viewing window 17 is located in the front face of the camera and operates in conjunction with a viewing system 19 for permitting viewing and framing of the scene by the operator.

Reference is now made to FIG. 4 for showing an objective or taking lens 20 which is mounted by a cylindrical lens mount 22 and allows for focusing of image carrying rays entering through the exposure opening 18 on a rearwardly positioned focal plane 24 by way of reflecting mirror 26 when the system of FIG. 1 is employed in conjunction with a suitable light-tight film exposure chamber 28.

Although the above exposure control system is herein described for use with photographic cameras of the non-reflex type, the intended scope of this invention is by no means so limited. Accordingly, cameras of the well-known reflex type, such as described in U.S. Pat. No. 3,672,281, entitled "Reflex Camera", by E. H. Land, commonly assigned herewith, may be equally suitable for embodying the exposure control system of this invention.

Again referring to FIG. 1, the improved exposure control system 32 of this invention is seen to include a blade mechanism having overlapping shutter blade elements 34, 36 supported intermediate the objective lens 20 and light entering exposure opening 18. Now turning to FIGS. 1 to 3, in conjunction with FIG. 4, a pair of scene light admitting primary apertures 38 and 40 are provided, respectively, in the blade elements 34 and 36. In use, the primary apertures 38 and 40 coincide and overlap progressively over the light entering exposure opening 18 to define progressively increasing effective aperture values as a function of the positions of the blades 34 and 36 during the exposure interval.

Each of the blades 34 and 36 is additionally configured to have photocell sweep secondary apertures 42 and 44, respectively. These secondary apertures 42 and 44 are configured in correspondence with the shapes of the primary apertures 38 and 40 and move in correspondence therewith to progressively coincide with each other to define progressively increasing secondary aperture values as a function of blade positioning during the exposure interval so as to control passage of scene light to a light detecting station 46; including a photoresponsive device or photocell 48.

The photocell 48 is of the silicon photodiode type and is aligned with a photocell light entry window (not shown) in the housing 14. Included in the light detecting station 46 is an integrating circuit for collectively operating with the photocell 48 for terminating the exposure interval as a function of the amount of light incident upon the photocell as allowed by the overlapping photocell sweep apertures 42 and 44. An exposure control mechanism embodying the above-described light detecting station is described in the copending U.S. patent application Ser. No. 74,993, filed on Sept. 13, 1979, and assigned commonly with the present invention. Consequently, only those details necessary for an understanding of the present invention will be given since they do not per se form an aspect of the invention.

With continued reference to the shutter blades 34, 36, a pivot pin 54 projects from the rear casting 12 at a location spaced laterally apart from the exposure opening 18, engages elongate slots 50 and 52 formed in each of the shutter blades for facilitating pivotal and translational movement of these blades.

Opposite ends of the shutter blades 34 and 36, respectively, include extended portions which pivotally connect to a walking beam 56. In turn, the walking beam 56 is disposed for rotation relative to the housing 10 by pivotal connection to a projecting pivot pin or stud 58 formed on the rear casting 12 and spaced from the exposure opening 18. An E-ring 60 retains the walking beam 56 in pivotal relation relative to the pivot pin 58. The walking beam 56 is pivotally connected at its distal ends to the shutter blades 34 and 36 by respective pin members 66 and 68 extending from the walking beam 56. Preferably, the pin members 66 and 68 extend through respective circular openings 62 and 64 in respective blade elements 34 and 36 to slidably engage respective arcuate slots or tracks 70 and 72 formed in the rear casting 12. These arcuate tracks 70 and 72 operate to prohibit disengagement of the shutter blades 34 and 36 from their respective pin members 66 and 68 during exposure control operation.

For displacing the shutter blades 34, 36 relative to each other and the casting 12, there is provided a tractive electromagnetic device or solenoid 74. Such solenoid 74 has an internally arranged movable cylindrical plunger unit 76. This plunger unit 76 retracts into the solenoid 74 upon energization of the latter. Since the plunger unit 76 is affixed to the walking beam 56 by means of a pivot pin or stud 78 as shown in FIG. 1, longitudinal displacement of the plunger 76 rotates the walking beam about the pivot pin 58. This causes appropriate displacement of the shutter blades 34 and 36; as will be described more fully.

For continuously urging the shutter blades 34 and 36 toward a position defining their largest effective aperture value over the light entry exposure opening 22, there is provided a biasing spring 80. A movable end of spring 80 is attached to the walking beam 56 by a pin 82, while its stationary end is affixed to a pin 84 extending from the casting 12.

With the spring connection herein described, the exposure control system of this invention is biased into a normally open orientation; see FIG. 3. Alternatively, the shutter blades 34, 36 are drawn to their closed or scene light blocking position while the solenoid 74 is energized. Consequently, energization of the solenoid 74 prevents the shutter blades 34, 36 from moving toward their maximum aperture opening under the urging of spring 80. However, as should be readily understood, the exposure control system of this invention would be equally applicable to photographic systems where the blades 34, 36 are spring biased to a normally closed position.

Since the solenoid 74 should not be continuously energized to maintain the shutter blades 34, 36 in the scene light blocking condition during extended periods of time during which the camera is not in use for purposes of battery power conservation, there is provided a latch mechanism (not shown) operable automatically at the end of each exposure for latching the walking beam 56 in its scene light blocking position. Accordingly, the solenoid 74 can be deenergized while the blades are in the scene light blocking condition. Unlatching of the latch mechanism commences upon exposure. Details of the latch mechanism and its operation do not per se form an aspect of this invention; therefore, reference is made to U.S. Pat. No. 4,040,072, issued Aug. 2, 1977 and assigned in common herewith, for a more complete description thereof.

Reference is now made to the flash strobe unit 86 of the present embodiment. The electronic flash strobe unit 86 is cooperatively associated with the photographic camera apparatus 10 to contribute a predetermined proportion, i.e. fill flash of the scene light admitted by the shutter blade mechanism to expose the film in a manner to be subsequently described. Since this type of fill flash does not per se form an aspect of the present invention, only those details necessary for an understanding of the present invention will be described. A more detailed description of the electronic flash apparatus is given in aforementioned application Ser. No. 74,993.

The electronic flash strobe unit 86 is affixed to an upper surface of the housing 10. Included in the unit 86 is a flash discharge tube 88 located in a suitable reflector 90 behind a lens 92. A quench tube (not shown) is provided for interrupting the flash discharge of the flash discharge tube 88, and electric power for the electronic flash strobe unit 86 is provided by a battery (not shown) carried in the film pack 16.

As described in the above-mentioned application, the output signal from a light integrator circuit (not shown) of the scene light detecting station 46 is directed to three level detector circuits (not shown) which all may be of a well-known design, such as a Schmitt trigger. The output from one of these level detectors controls a flash fire trigger circuit (not shown) of the electronic flash unit 86. The second level detector is effective to control the energization of the solenoid 74, and the third level detector is effective to control a flash quench circuit (not shown).

For purposes of illustrating operation of the flash unit 86, the level detector which controls energization of the solenoid (to close the shutter) is configured to trigger at 1.0 volt, which is a normalized value representative of a select or optimum film exposure value for a predetermined film speed; the level detector for controlling the quench trigger circuit is set to trigger at 1.2 volts; and the level detector for controlling the flash fire trigger circuit is set to trigger at 0.75 volts. Reasons for these relationships are more adequately described in the noted copending application. These values will, however, later serve to better describe the present invention. Also, a flash time delay circuit (not shown), which receives an input signal upon the deenergization of the solenoid 74, is included to provide a time delayed flash fire signal operative to trigger the flash under very low ambient light conditions as later explained in detail. The time delay provided by the flash delay circuit may be in the order of 65±4 msec. Finally, a shutter time out circuit (not shown) is also provided as described in the noted copending application.

Operation of a camera actuator button (not shown) powers up the camera 10, enables the strobe unit 86 for subsequent firing and releases the shutter latch mechanism to allow shutter blade movement to commence the exposure cycle. More specifically, the shutter blades 34 and 36 move in opposite directions from the scene light blocking condition of FIG. 1 toward the maximum primary aperture value shown in FIG. 3. Thus, the effective aperture area over the light entering exposure opening 18 is enlarged progressively.

Simultaneously with enlarging primary aperture values, the secondary photocell sweep apertures 42 and 44 define a corresponding progressively enlarging secondary effective aperture opening over the light detecting station 46. In this embodiment, the effective photocell sweep secondary aperture defined by the overlapping secondary apertures 42 and 44 tracks ahead of or leads the effective scene light admitting primary aperture defined by the overlapping primary apertures 38 and 40 to anticipate in a well-known manner for the additional scene light admitted to the film plane during the finite time required to drive the shutter blades 34, 36 from the scene light unblocking arrangement of FIG. 3 back to the scene light blocking arrangement of FIG. 1, as is more fully described in U.S. Pat. No. 3,896,458, entitled "Automatic Exposure Control System", issued July 22, 1975, in common assignment herewith and now incorporated by reference herein.

The photocell 48 provides a time varying response representative of the time integration of the scene light intensity incident to the photocell 48. Under conditions of moderate to high scene light, when the integration signal reaches 0.75 volts, the flash level detector triggers firing of the flash discharge tube 88 in a well-known manner. Assuming the photographic subject is within the effective range of the flash, there will be an immediate and substantial increase in the reflected scene light to which the detecting station 46 will respond to provide the required voltages to trigger the second and third level detectors for respectively effecting reenergization of the solenoid 74 and quenching the flash tube. Thus, the shutter blades 34, 36 move back to the scene light blocking arrangement as shown in FIG. 1, and the exposure interval is terminated.

With diminished intensity of scene light, the flash unit is fired at later times such that the flash is fired at larger primary and secondary aperture values.

Under conditions of extremely low or negligible ambient scene light intensity, the light integrator circuit will not provide a 0.75 volt output response prior to the expiration of the 65±4 millisecond flash time delay. For these conditions, a signal is transmitted by the flash delay circuit at the expiration of the noted time delay to effect flash firing. Moreover, in the event that there is neither sufficient available ambient scene light and/or artificial flash light for the output signal from the light integrator to reach 1 volt, the shutter time out circuit operates to energize the solenoid 74 and thereby limit the maximum exposure interval to, for example, 100 milliseconds. In this manner, the camera apparatus of this invention is provided with an electronic flash together with means for controlling the energization of the electronic flash to assure that a predetermined proportion of a select film exposure value will be attributable to the artificial light provided by the electronic flash at least when a subject is within the effective camera-to-subject distance range of the flash.

Referring back to the secondary sweep apertures 42, 44, each is partially occupied with an infrared (IR) absorption filter element 94 positioned therein to overly and control the photometric response of the photocell 48 during initial stages in opening of the blades. The filter 94 attenuates spectral energy in the wavelength range to which the cell is sensitive (e.g., 360–1200 nm) and specifically precludes transmission of most of the light in the near IR region (e.g., 700–1200 nm). Thus, when covered by the filter 94, the photocell 48 receives only the remaining visible spectral energy. Such filter 94 can be made from appropriate materials including commercial glasses or from several combinations of IR-absorbing, metal-organic dyes dissolved or dispersed in a molded plastic optic element.

As more clearly depicted in FIGS. 1-3, each of the sweep apertures 42, 44 is provided with narrow leading filter portions 96 while a trailing segment 98 of each of these apertures is defined as a generally circular portion without a filter. It will be observed that the light admitting area of the leading portions 96 gradually increase towards the trailing segment 98. Thus, as the leading portions 96 coincide and progressively overlap the photocell 48 during sweep of the shutter blades 34, 36 from their positions of FIG. 1 towards the positions shown in FIGS. 2 and 3, they define progressively increasing aperture sizes.

Since, under high ambient light conditions the blade scan is terminated early, only relatively small aperture values are provided over the photocell 48 under such conditions. Hence, the filter 94 blocks, or precludes transmission of, IR radiation from the scene at such time.

However, with lower ambient light levels, the secondary apertures 44, 42 are allowed to advance further to define larger light admitting aperture values. Accordingly, the shutter blades 32, 34 may move to the position shown in FIG. 3 where the filterless trailing segments 98 overlap the photocell 48. Consequently, in the latter case, the scene light incident upon the photocell 48 is selectively filtered to block IR during one portion of the displacement of the shutter blades 34, 36 or that is, an initial portion of the exposure interval and is then unfiltered so that the photocell responds to both IR and visible radiation during another portion of the displacement.

Hence, it should be understood that the filter 94 provides filtering means responsive to blade movement, and specifically carried by said blade mechanism, for automatically precluding transmission of light of selected frequencies to said detecting means during at least one portion of said displacement of said blade mechanism toward said second position and for transmitting said selected frequencies to said detecting means during another portion of said displacement.

In accordance with this invention when the strobe 86 is fired in those situations of low ambient scene light (where the flash contribution to the resulting photograph is predominant as compared to the ambient contribution), the shutter blades 34, 36 will, during scanning, be positioned during the flash so that the IR filters 94 are not in spectral filtering relationship to the photocell 48. Thus, the photocell 48 is no longer blocked from receiving IR radiation. As a result, only visible light will be incident upon the photocell 48 during the initial part of blade scan where only ambient light makes up the exposure while both visible and IR will be incident thereon during the flash portion of the exposure and the earlier mentioned difficulties of providing for both flash and ambient conditions will be substantially overcome. In this regard, objects viewed in the visible spectral region exhibit widely different light reflectivities while the near infrared region (e.g., 750–1200 nm) is characterized by more uniform reflectivity for most common materials. Therefore, the IR reflectivity is much less dependent on the visible color (specific visible light absorption), and objects viewed by infrared radiation are relatively independent of the reflectivity disparities earlier described. Consequently, in scenes where disparate visible reflectivities are present (or which can be exaggerated by directed light sources such as flash bulbs or strobe lights), the IR radiation is preferably left undisturbed.

Advantageously, in operation under high ambient light conditions, where the blades reach only small scanning aperture values, the novel system essentially precludes IR photocell reception and hence, IR evaluation. However, with lower ambient conditions, as the scan begins to reach larger aperture values, it provides at least partly unfiltered reception at these increased aperture values. Since the flash is fired at later rather than early stages of the scan, flash firing which assumes greater importance under lowered ambient conditions is thus coincident with the unfiltered reception. Finally, for low ambient conditions where the blades reach their full aperture value at which time the flash is fired, the initial primarily ambient portion of the exposure is provided under evaluation of essentially only visible light while the flash portion of the interval occurs under an exposure evaluation employing both visible and infrared scene radiation.

Reference is now made to FIG. 5 for showing another embodiment of this invention. Although the following description of construction is in connection with a single blade 34', it should be appreciated that both shutter blades are made in a similar fashion. In this embodiment, the shutter blade 34' is essentially made of an IR filter material with the surface 104 being selectively covered with an opaque material in a manner to be described. The primary aperture (not shown) is formed as described in the previous embodiment. However, the IR filter portion 94' of the secondary sweep apertures 42' is actually made up of the blade material itself. It will be appreciated that the opaque surface 104 defines the boundaries of the sweep aperture 42' including leading portion 96'. The trailing portion 98' is formed by an opening extending through the shutter blade 32'.

The light integrating unit provides an evaluation of scene radiation during an evaluation period which, in the illustrated embodiment, occurs essentially simultaneous with at least the initial stages of the exposure interval. Further, since the light integration only continues until a 1.2 volt level is reached, the actual length of the evaluation period is determined by the scene radiation; however, it should be understood that novel arrangements described herein are also applicable to pre-evaluation of scene lighting and to fixed periods of evaluation.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. In a photographic camera apparatus including means for mounting photographic film material at a given focal plane; a light exposure opening for allowing passage of light to the film; detecting means for evaluating scene light; a blade mechanism mounted for displacement between a first and second position; said blade mechanism precluding passage of scene light through said exposure opening when in said first position and defining changing primary aperture values over said exposure opening and changing secondary aperture values over said detecting means as said blade mechanism moves toward said second position; and drive means actuatable for initially displacing said blade mechanism from said first position toward said second position and, in response to the amount of scene light detected by said detecting means, for returning said blade mechanism to said first position, the improvement comprising:

filtering means responsive to displacement of said blade mechanism for automatically precluding transmission of selected frequencies of scene light to said detecting means during at least one portion of said displacement of said blade mechanism toward said second position while transmitting other spectral frequencies thereto and for transmitting said selected frequencies to said detecting means during another portion of said displacement, said filtering means includes a spectral filter coupled to said blade mechanism so as to be operatively positioned over said detecting means during said one portion of said displacement and inoperatively spaced away from said detecting means during said other portion thereof.

2. The apparatus of claim 1 wherein said filtering means is carried by said blade mechanism for automatically precluding transmission of light of selected frequencies to said detecting means during at least one portion of said displacement of said blade mechanism toward said second position and for transmitting said selected frequencies to said detecting means during another portion of said displacement.

3. The apparatus of claim 1 wherein said filtering means includes a spectral filter coupled to said blade mechanism such that its position relative to said detecting means is dependent upon the position of said blade mechanism during movement between said first and second position.

4. The apparatus of claim 1 wherein said filtering means precludes transmission of infrared frequencies during said one portion of said blade displacement.

5. The apparatus of claim 4 including a flash means triggered to produce a flash of light during a latter part of each said scan, and wherein said filtering means is coupled to said blades so as to preclude transmission of infrared frequencies during an early stage of blade displacement and to transmit said frequencies during later stages thereof such that said transmission is coincidental with flash firing under low ambient light conditions.

6. The apparatus of claim 1 wherein said blade mechanism includes a pair of shutter blades, each having spaced primary and secondary apertures, each of said primary apertures movable in overlapping relationship with the other and are so constructed to define a range of progressively increasing primary aperture values over said exposure opening, and each of said secondary apertures movable in overlapping relation to the other are so constructed to define a range of progressively increasing aperture values over said detecting means as said blades are moved relative to each other, and said filtering means being a spectral filter coupled to at least one of said blades in association with the secondary aperture thereof so as to be displaced therewith into at least partly overlying relation with said light detecting means after said blade mechanism is initially displaced toward said second position and out of overlying relation relative to said detecting means as said blade mechanism approaches its said second position.

7. The apparatus of claim 6 wherein said spectral filter is constructed to be in overlying relation to said detecting means when the secondary apertures define only relatively small aperture values under predominantly high ambient light conditions and is out of overlying relationship when the secondary apertures also define relatively large aperture values under predominantly low ambient or flash conditions.

8. In an exposure control system for photographic apparatus of the type including means for positioning photographic film material at a given focal plane, a light exposure opening allowing passage of scene light to the film; said system including scene light detecting means for detecting scene light transmitted to said focal plane;

a blade mechanism including a shutter blade having a spaced apart primary and secondary aperture, said primary aperture arranged to enable changing aperture sizes over said exposure opening and said secondary aperture arranged to enable a range of changing aperture sizes over said light detecting means during movement of said blade from a first to a second position; means for mounting said blade element for displacement between said first and second positions; and selectively actuatable drive means for displacing said blade between said first and second positions, the improvement wherein said detecting means comprises:

means responsive to operation of said unblocking means including filtering means responsive to displacement of said blade mechanism for automatically precluding transmission of selected frequencies of scene light to said detecting means during at least one portion of said displacement of said blade mechanism toward said second position while transmitting other spectral frequencies and for transmitting said selected frequencies to said detecting means during another portion of said displacement, said filtering means includes a spectral filter coupled to said blade mechanism so as to be operatively positioned over said detecting means during said one portion of said displacement and inoperatively spaced away from said detecting means during said other portion thereof.

9. The exposure control system of claim 8 wherein said filtering means comprises a spectral filter material occupying a preselected portion of said secondary aperture.

10. The exposure control system of claim 9 wherein said material is infrared absorption filter material.

11. The exposure control system of claim 8 wherein said blade is moved in a given direction from said first to said second position, and said filter material is mounted on said blade in covering relation to a portion of said secondary aperture adjoining the leading edge thereof so as to thereby enable positioning of said filter material in increasing overlying relation to said detecting means as said blade is initially displaced from said first position.

12. The exposure control system of claim 8 wherein said filtering means is a relatively thin sheet of spectral filter material occupying a leading portion of each of said secondary apertures such that said spectral filters overlap said detecting means when said blade mechanism defines relatively small secondary aperture values and are out of overlapping relation to said detecting means when said blade mechanism defines relatively large secondary aperture values.

* * * * *